US007692913B2

(12) United States Patent
Frescaline

(10) Patent No.: US 7,692,913 B2
(45) Date of Patent: Apr. 6, 2010

(54) MULTICHANNEL SPARK-GAP WITH MULTIPLE INTERVALS AND PULSED HIGH-POWER GENERATOR

(75) Inventor: Laurent Frescaline, Aynac (FR)

(73) Assignee: I-Pulse Inc., Tijeras, NM (US)

( * ) Notice: Subject to any disclaimer, the term of this patent is extended or adjusted under 35 U.S.C. 154(b) by 483 days.

(21) Appl. No.: 11/793,612

(22) PCT Filed: Nov. 16, 2005

(86) PCT No.: PCT/FR2005/002837

§ 371 (c)(1),
(2), (4) Date: Jun. 20, 2007

(87) PCT Pub. No.: WO2006/070082

PCT Pub. Date: Jul. 6, 2006

(65) Prior Publication Data

US 2008/0106840 A1 May 8, 2008

(30) Foreign Application Priority Data

Dec. 22, 2004 (FR) .................................. 04 13718

(51) Int. Cl.
*H02H 1/00* (2006.01)
*H01T 1/22* (2006.01)

(52) U.S. Cl. ...................................... 361/130; 361/231

(58) Field of Classification Search ................. 361/130, 361/231
See application file for complete search history.

(56) References Cited

U.S. PATENT DOCUMENTS 2,817,036 A * 12/1957 Neal .......................... 313/146
3,087,091 A * 4/1963 McFarland .............. 315/241 R
3,353,059 A * 11/1967 Buffa et al. .................. 315/36
3,584,260 A * 6/1971 Barbini ....................... 361/117
4,198,590 A * 4/1980 Harris ........................ 315/335

OTHER PUBLICATIONS

Kovalchuk et al., "Multi Gap Switch for Marx Generators," 28$^{th}$ IEEE Int. Conf. on Plasma Sci, 13$^{th}$ IEEE Pulsed Power Conf., Las Vegas, vol. 2, pp. 1739-1742 (2001).

Reinovsky et al., "Shiva Star Pulse Compression System", 4$^{th}$ IEEE Pulsed Power Conference, Albuquerque, NM, pp. 196-201 (1983).

* cited by examiner

*Primary Examiner*—Stephen W Jackson
*Assistant Examiner*—Scott Bauer
(74) *Attorney, Agent, or Firm*—Young & Thompson

(57) ABSTRACT

A multichannel spark-gap with multiple intervals for use in pulsed high-power generators of the LTD family. The spark-gap includes a sealed chamber, two discharge electrodes connected to electrical connecting elements, and a number of intermediate electrodes arranged uniformly inside the sealed chamber. One of the intermediate electrodes is called triggering electrode and is connected to triggering elements enabling the spark-gap to be fired. The triggering electrode further includes integral pipes enabling a gas to be distributed inside the chamber, so as to improve the voltage strength of the spark-gap. The spark-gap is characterised in that the negative discharge electrode includes a corona effect device equipped with needles whereof the geometry is adapted to compensate for the differences in shape between the negative discharge electrode and the immediately adjacent intermediate electrode so as to ensure a homogeneous distribution of the potentials inside the sealed chamber.

20 Claims, 3 Drawing Sheets

A-A

A-A

MULTICHANNEL SPARK-GAP WITH MULTIPLE INTERVALS AND PULSED HIGH-POWER GENERATOR

Figure 2:
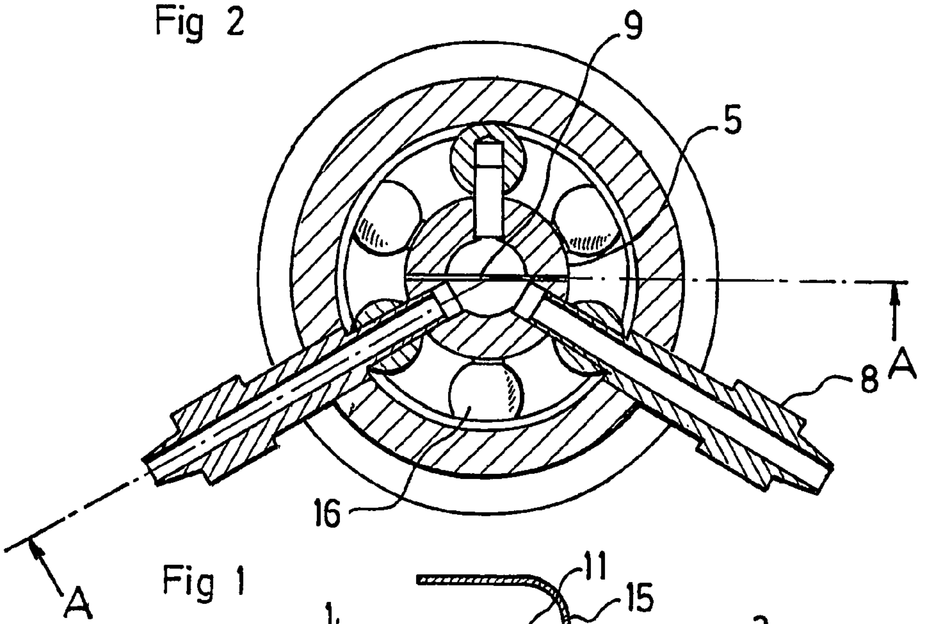

The invention concerns a multichannel spark-gap with multiple intervals designed in particular for use in pulsed high-power generators of the Linear Transformer Driver (LTD) family.

Spark-gaps designed for example for use in pulsed high-power generators are devices which have to allow significant electrical energy to be transferred in a small amount of time. For high-speed applications (characteristic time of less than 1 to 2 μs), the performance of a spark-gap is thereby usually judged in the light of its voltage strength and its inductance value, indicative of the duration of the electric discharge. So it is that, in order to reduce inductance and increase the quantity of charges, a proposal has been made to multiply the number of channels, in other words, to multiply the number of electric arcs which will be produced during the charge transfer. Different models of multichannel spark-gaps have thus been developed, in particular by the Russian High Current Electronics Institute (HCEI) and Maxwell laboratories (cf. SHIVA STAR INDUCTIVE PULSE COMPRESSION SYSTEM, R. E. Reinovsky et al., $4^{th}$ IEEE Pulsed Power Conf, Albuquerque, N. Mex., Jun. 6-8, 1983, p 196).

Multichannel spark-gaps with multiple intervals generally comprise two so-called discharge electrodes, to which the charging voltages are applied, and a series of so-called intermediate electrodes uniformly arranged between the two discharge electrodes so as to delimit a certain number of intervals in which the potentials applied to the spark-gap terminals are distributed more or less homogeneously. This electrode unit is generally enclosed in a leak tight sealed chamber which may be supplied with a gas.

So it is that the multichannel spark-gaps with multiple intervals, marketed under the name "T508 A/AX", have come to be developed. This type of spark-gap enables voltages of the order of ±100 kV to be withstood in complete safety when it is filled with sulphur hexafluoride (SF6) at high pressures.

To be free from the use of SF6, multichannel spark-gaps with multiple intervals have been perfected, supplied with pressurised dry air. These spark-gaps allow the same performance to be obtained and the corona effect to be used which enables the potentials to be distributed in a relatively homogeneous way between the different intermediate electrodes (cf. MULTI GAP SWITCH FOR MARX GENERATORS, B. M. Kovalchuk et al., 2002, IEEE, ISBN 0-7803-7120-8/02). Different spark-gap models have therefore been perfected. The shape of the spark-gap, the number of electrodes and the way in which they are anchored to the casing, have been tested. For ultra high-speed applications (characteristic time of less than 1 to 2 μs), the best product in terms of the compactness-to-performance ratio, was obtained with the model with five intermediate electrodes, each one being equipped, on its axis of symmetry, with a corona effect needle. In the same way, the discharge electrode subjected to the negative potential is equipped at its centre with a corona effect needle. The spark-gap thus developed is filled with compressed air and subjected in the charge cycle to a voltage of ±100 kV. The intermediate electrode, arranged halfway between the two discharge electrodes, is connected to triggering means, enabling the spark-gap to be fired. This triggering electrode is subjected in the charge cycle to a zero volt potential. The spark-gap is thus divided into two zones, one of negative polarity, and the other of positive polarity. It has been proved that if the pressure in the spark-gap is 2.5 atm (1 atm=$10^5$ Pa), the zone of positive polarity withstands the voltage whereas the zone of negative polarity triggers spontaneously. The zone of negative polarity withstands the voltage only if the air pressure reaches 4 atm. The result of this increase in pressure, in standard operating mode, is an increase in spark-gap inductance.

The invention aims to overcome these different problems and to propose a multichannel spark-gap that is able to withstand extremely high voltages while having the lower inductance and resistance.

Another objective of the invention is to perfect a spark-gap whereof the pressure in the sealed chamber is low enough to limit resistance and inductance, but sufficiently significant nonetheless to withstand the high voltages applied to the spark-gap terminals.

The invention additionally proposes to provide a multichannel spark-gap with multiple intervals, whereof the geometry enables a substantial reduction in the electric field on the electrodes, conditioning good voltage strength at minimum pressure.

To this end, the multichannel spark-gap with multiple intervals targeted by the invention comprises:

a sealed chamber comprising two electrodes mounted apart from each other, one of so-called positive discharge, the other full, of so-called negative discharge, at least one so-called intermediate electrode, provided in the sealed chamber between the two discharge electrodes so as to delimit intervals between said discharge electrodes, one of the intermediate electrodes being immediately adjacent to the negative discharge electrode, electrical connecting means adapted to allow the positive discharge electrode to be connected to a positive potential and the negative discharge electrode to a negative potential, means adapted to allow at least one intermediate electrode, known as an intermediate triggering electrode, to be subjected to a preset potential in the charge phase, and to a different potential enabling firing to be triggered, in the firing phase, needles provided in the sealed chamber to generate discharges therein by corona effect with a view to subjecting the intervals delimited by the electrode or electrodes to intermediate potentials, means for the distribution of a gas in the sealed chamber.

According to the present invention, said spark-gap is characterised in that the negative discharge electrode comprises a corona effect needle device whereof the geometry is adapted to compensate for differences in shape, in other words differences in geometry and/or dimensions, between the negative discharge electrode and the immediately adjacent intermediate electrode, so as to ensure a substantially homogenous distribution of the potentials throughout the chamber.

Indeed, the negative discharge electrode and the immediately adjacent intermediate electrode have different shapes. In particular, the part of the immediately adjacent intermediate electrode orientated towards the positive discharge electrode has a different shape from that of the negative electrode. Experiments have shown that implanting, on the negative discharge electrode, a corona effect needle device whereof the geometry is adapted to compensate for the differences in shape between the negative discharge electrode and the adjacent intermediate electrode enabled improved spark-gap voltage strength on account of a better distribution of the potentials inside the chamber. The geometry of the needle device helps to improve the distribution of the potentials through a charge transfer in the spark-gap during the potential rise.

The spark-gap according to the invention is preferably implemented by equipping each intermediate electrode with at least one corona effect needle and by choosing a geometry for the needle device of the negative discharge electrode from one of the following configurations: a device comprising at least one corona effect needle larger than the other corona effect needles arranged in the chamber, a device comprising a number of corona effect needles greater than the number of corona effect needles of each intermediate electrode, or a device comprising needles of geometric shapes adapted to promote a homogeneous distribution of the potentials in the chamber. The geometry of the corona effect needle device of the negative electrode may be varied and depends on the shape of the negative electrode and of the adjacent intermediate electrode.

The arrangement of the corona effect needles according to the invention and the result obtained is at first sight unexpected and even paradoxical; indeed intuitively the man skilled in the art tends to look for absolute symmetry when implanting corona effect needles on the electrodes for the following reason: in the vicinity of a tip, the corona effect is responsible for the local increase in the value of the electric field through the contraction of the equipotential surfaces; unbalancing these effects along the chamber causes in principle an imbalance in the distribution of the potentials. Experience shows that, contrary to received wisdom, implanting on the negative discharge electrode a larger needle for example than on the other electrodes in fact homogenises the distribution of the potentials in the spark-gap. This may be explained after the event by the fact that in reality, the first interval does not react like the others and that the search for a homogeneous distribution of the potentials means promoting the transfer of charge from the first interval, between the negative discharge electrode and the immediately adjacent intermediate electrode, which is achieved in the invention by implanting a needle device whereof the geometry is adapted to compensate for differences in shape, for example, by increasing the length of the corona effect needle on the negative discharge electrode. The spark-gap according to the invention thereby enables a better distribution of the potentials, while limiting its size and its inductance.

To advantage and according to the invention, at least one corona effect needle is provided on each intermediate electrode, and on the other hand, the needle device of the negative discharge electrode comprises at least one corona effect needle whereof the size is adapted so that the distance separating the tip of said corona effect needle of the needle device and said immediately adjacent intermediate electrode is different from each of the distances separating the tip of each corona effect needle of each intermediate electrode and the intermediate electrode located immediately facing the tip of the corona effect needle.

To advantage and according to the invention, the needle device of the negative discharge electrode comprises at least one corona effect needle whereof the size is adapted so that the distance separating the tip of the corona effect needle of the needle device and the immediately adjacent intermediate electrode is smaller than each of the distances separating the tip of each corona effect needle of each intermediate electrode and the intermediate electrode located immediately facing the tip of the corona effect needle. These differences promote a homogeneous distribution of the potentials in the chamber balancing the charge transfer from the first interval relative to the others.

To advantage and according to the invention, the length of the interval delimited by the negative discharge electrode and the immediately adjacent intermediate electrode is smaller than the length of the other spark-gap intervals.

To advantage and according to the invention, at least one corona effect needle is provided on each intermediate electrode, and the needle device of the negative discharge electrode comprises at least one corona effect needle larger than each of the other corona effect needles of the chamber.

To advantage and according to the invention, at least one corona effect needle is provided on each intermediate electrode, and the needle device of the negative discharge electrode comprises a number of corona effect needles greater than the number of needles carried by each intermediate electrode.

To advantage and according to the invention, the corona effect needles are mounted on each of the electrodes so as to point in the direction of the positive discharge electrode. The needles may be located on the longitudinal axis of the spark-gap or on parallel axes. The fact of mounting the needles to point towards the positive discharge electrode enables a better distribution of the potentials. Moreover, this arrangement creates, inside the sealed chamber, two zones with different properties: a zone of negative polarity delimited by the negative discharge electrode and the first triggering electrode; a zone of positive polarity delimited by the final triggering electrode and the positive discharge electrode. To advantage, the spark-gap is equipped with a single triggering electrode located halfway between the two discharge electrodes, thereby creating two zones of the same dimensions, of different polarities.

To advantage and according to the invention, the negative discharge electrode additionally comprises, in reinforcement inside the sealed chamber, means for reducing the electrical field in the chamber. These field reduction means, associated with the corona effect needles mounted on the negative discharge electrode, allow the operating pressure of the spark-gap to be reduced. These means preferably comprise annular beads arranged around the needles carried by the negative discharge electrode.

This sealed chamber can in particular be cylindrical of revolution in shape and extend along a longitudinal axis.

To advantage and according to the invention, the intermediate electrodes are torus-shaped and comprise a diametrical rod on which the corona effect needle (or needles) is (or are) mounted, so as to ensure better distribution of the potentials in the spark-gap. In particular, the intermediate electrodes may have an openwork design.

To advantage and according to the invention, the intermediate electrodes are anchored in the sealed chamber by spherical anchoring means that are conductive and distributed uniformly around the longitudinal axis.

To advantage and according to the invention, the means for distributing gas in the sealed chamber comprise at least one pipe integral with a least one intermediate electrode, each pipe extending radially from the outside of the sealed chamber as far as the intermediate electrode.

To advantage and according to the invention, the spark-gap comprises five intermediate electrodes, the intervals delimited by two intermediate electrodes being substantially identical.

To advantage and according to the invention, the spark-gap comprises a single intermediate triggering electrode, arranged halfway between the two discharge electrodes, thereby delimiting two zones of substantially equal volume and of negative and positive polarity respectively, each being able to withstand the same voltage at the same pressure.

To advantage and according to the invention, the length of the intervals delimited by the electrodes, in the longitudinal direction, is less than 2 cm so as to limit the inductance. Preferably the length of the intervals delimited by the electrodes, in the longitudinal direction, will be less than 1 cm so as to minimise the inductance.

Furthermore, in a preferential application, one (or more) spark-gaps according to the invention is (or are) implanted in a slow or fast LTD pulsed high-power generator.

To advantage and according to the invention, the LTD generator will operate with spark-gaps filled, through the gas distribution means, with pressurised air at less than 3 atm and subjected to voltages of the order of 200 kV.

Figure 1:
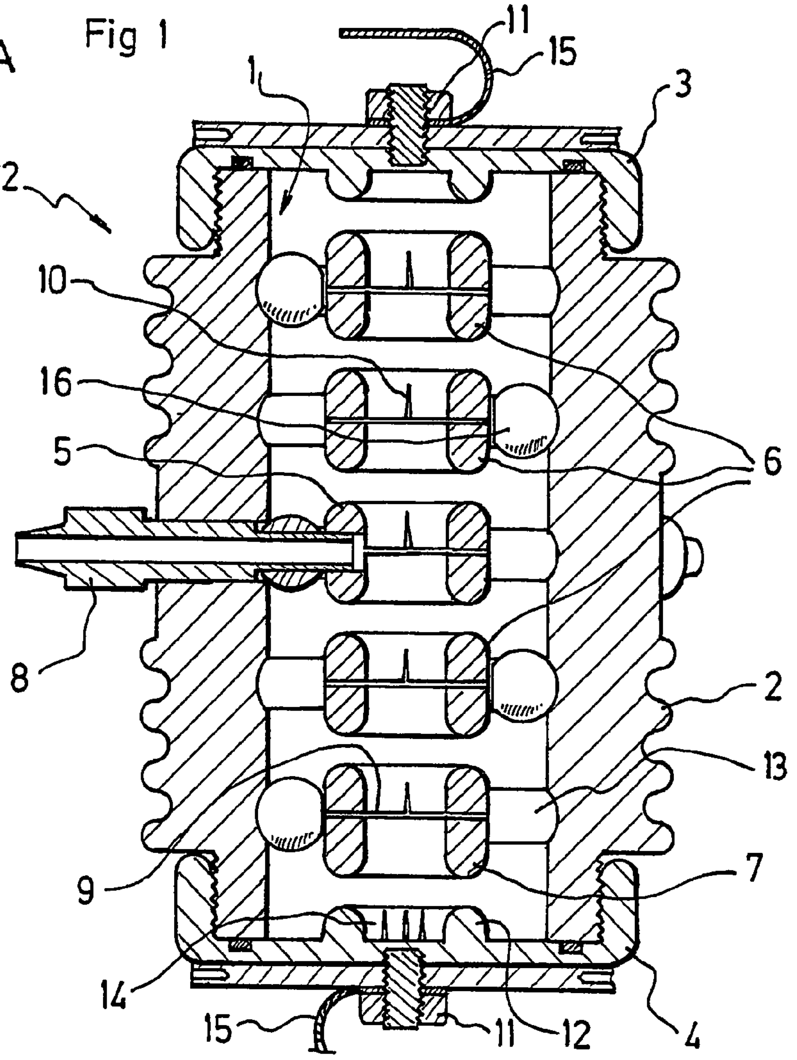
Figure 3:
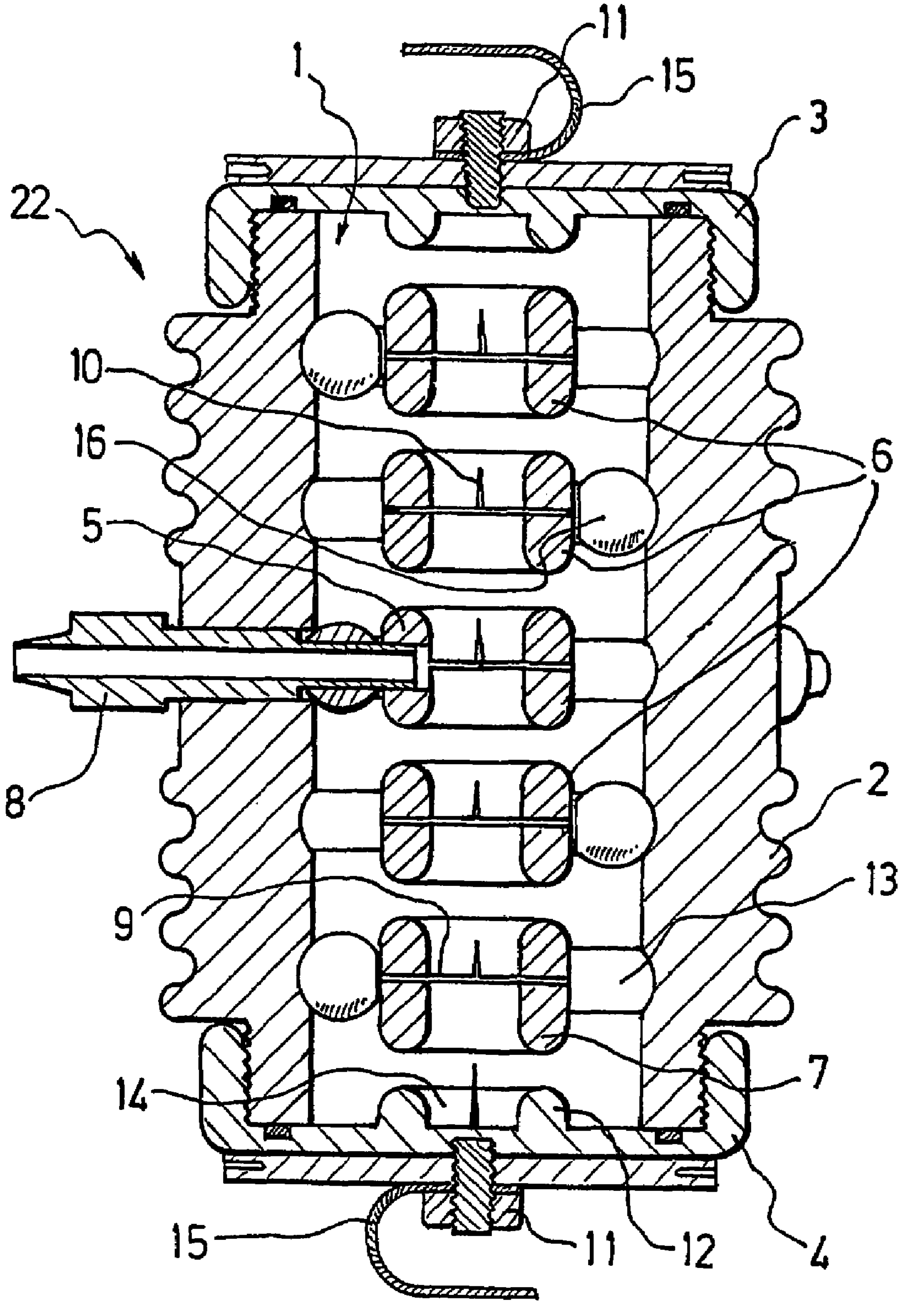
Figure 4:
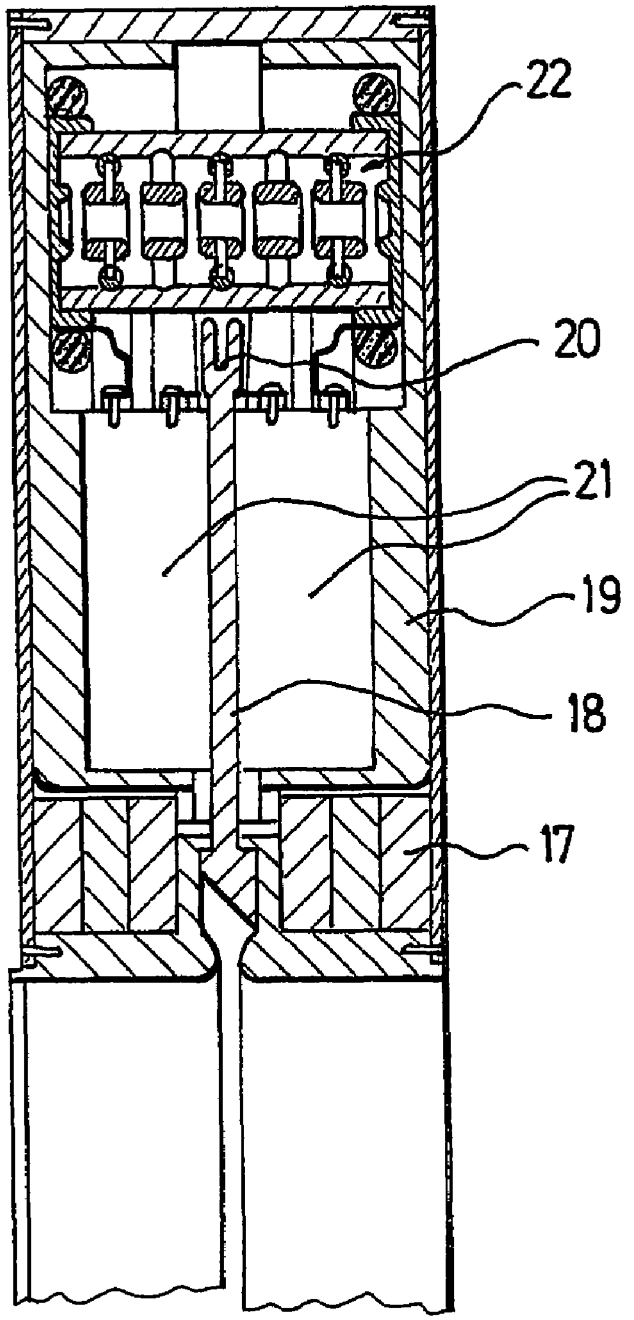

Other characteristics, purposes and advantages of the invention will emerge from reading the following description which gives as a non-restrictive example one embodiment of the invention, with reference to the appended drawings. In these drawings:

FIG. 1 is a diagram in longitudinal cross-section of the spark-gap according to one embodiment, FIG. 2 is a radial cross-section of the spark-gap according to the embodiment of the spark-gap in FIG. 1, FIG. 3 is a diagram in longitudinal cross-section according to another embodiment of the present invention, FIG. 4 is a general view of an LTD generator stage comprising a spark-gap as shown in FIG. 1.

In these figures, scales and proportions are not strictly adhered to, for reasons of illustration and clarity.

In FIG. 1, a sealed chamber 1 is delimited on the one hand, by a casing 2, which ideally is made out of Polyamide-6, but can also be made out of polyethylene, or another thermoplastic resin, and on the other hand, by two electrodes with positive discharge 3 and negative discharge 4. The two discharge electrodes are connected to electrical connecting means 15 and screwed into the casing using screws 11.

The embodiment specified comprises five intermediate electrodes 6 uniformly distributed inside the chamber 1 including a triggering electrode 5, provided halfway between the two discharge electrodes. These five electrodes thereby form six intervals, with a dimension in the longitudinal direction which is typically and ideally 6 mm. This dimension in the longitudinal direction may nonetheless be different, in particular of between 0.3 cm and 2 cm. According to another embodiment of the present invention, the length of the interval delimited by the negative discharge electrode and the immediately adjacent intermediate electrode may be less than the lengths of the other spark-gap intervals.

Each intermediate electrode 5, 6, 7 is torus-shaped. Ideally, the electrodes are elliptical tori. An elliptical torus is, in accordance with the definition in general mechanics, a torus which is an ellipse in cross section. In other words and according to the embodiment in FIG. 1, it is a volume obtained by rotating an ellipse around an axis parallel to the major axis of the ellipse and located at a distance R therefrom. According to the embodiment in FIG. 1, the minor axis of the ellipse is typically 1 cm and the distance R of the torus is typically 3 cm. The major axis of the ellipse is preferably 2 cm. Furthermore, the electrodes 3, 4, 5, 6, 7 are generally made of stainless steel, that may also be made using another conductive material such as brass.

Preferably, the intermediate electrodes 5, 6, 7 are anchored to the casing 2 by means of anchoring balls 16. In the embodiment specified in FIG. 1, the electrodes 5, 6, 7 are anchored to the anchoring balls 16 by a screw and nut system.

The anchoring balls 16 are for example spherical with a radius of 1.5 cm. These balls are preferably made of steel enriched with carbon. They are furthermore coated, for example, with titanium nitride or any other ceramic in a thin layer, with a view to protecting it against wear. These balls are preferably three in number per electrode and angularly separated one from another by an angle of 120° around the longitudinal axis. Preferably, the anchoring balls 16 of an electrode 5, 6, 7 are offset by 60° around the longitudinal axis, relative to the anchoring balls of the adjacent intermediate electrode. These anchoring balls are for their part accommodated in grooves 13 shaped in the internal wall of the casing.

Moreover, the intermediate electrodes 5, 6, 7 according to the embodiment specified in FIG. 1, each comprise a diametrical rod 9. The diametrical rods 9 are preferably made of stainless steel and are cylindrical overall in shape with a diameter of less than 4 mm.

According to the embodiment specified in FIG. 1, each rod 9 comprises a corona effect needle 10 provided on the longitudinal axis. Conventionally, needle is taken to mean any device pointed overall that is able to generate charging currents by corona effect. It may be a needle, a cone or a small cylinder. Preferably nonetheless, the corona effect needles 10 are substantially cylindrical, 1 mm in diameter and 6 mm in height, and are made of stainless steel. The corona effect needles 10 welded onto the diametrical rods are, according to the embodiment in FIG. 1, all of the same size, but may, according to other embodiments of the present invention, be of different size, so as to ensure a homogenous distribution of the potentials in the chamber.

The negative discharge electrode 4 comprises for its part a needle device 14 whereof the geometry is adapted to compensate for the differences in shape between the negative discharge electrode and the immediately adjacent intermediate electrode. According to the embodiment in FIG. 1, the needle device 14 comprises three corona effect needles, welded directly on the inner surface to the casing of the negative electrode and pointing towards the positive discharge electrode 3. According to the embodiment in FIG. 1, the corona effect needles of the negative discharge electrode are identical to those of the intermediate electrodes. According to the embodiment in FIG. 3, the needle device 14 comprises a single corona effect needle larger in size than all the other needles. This geometry of the device also makes it possible to compensate for the difference in shape between the negative discharge electrode and the adjacent intermediate electrode. According to the embodiment in FIG. 1, the central needle is welded on the inner surface to the casing of the negative electrode 4, along the longitudinal axis so as to be substantially aligned with the corona effect needles 10 of the intermediate electrodes 5, 6, 7. The other two needles are welded on the same surface of the electrode halfway between the central needle and annular beads 12, on a diametrical axis. According to the embodiment in FIG. 1, the needles of the negative discharge electrode are welded so as to face the diametrical rod supporting the corona effect needle of the first intermediate electrode.

The needle device 14 according to the embodiment in FIG. 1 has the advantage of keeping a sufficient distance between the end of the needles and the adjacent electrode, which enables the electrical field in the interval to be limited. On the other hand, the needle device 14 according to the embodiment in FIG. 3 has the advantage of being more cost-effective and easier to manufacture.

According to the embodiment in FIG. 1, the negative discharge electrode 4 further comprises electrical field reduction means. Preferably, these means are annular beads 12. These annular beads 12 may have the shape of a half-torus, in other words have the shape of a volume generated by the rotation of a half circle around an axis perpendicular to the straight part of a half circle and located at a distance R' from the centre of the half circle. Preferably, the distance R' will be equal to the distance R of the tori constituting the intermediate electrodes. The radius of the half circle will preferably be 1 cm.

FIG. 2 also shows the triggering electrode 5 according to an embodiment of the present invention. The triggering electrode 5 comprises two integral pipes 8 which are used for the supply of gas to and discharge of gas from the sealed chamber 1. The pipes 8 are ideally screwed into the casing and the screw threads are coated with silicone sealant. These pipes 8 are preferably cylindrical overall with a diameter of 1 cm and a length of 6 cm. According to one of the embodiments of the present invention, these pipes 8 may also be used to trigger the discharge. The triggering means may be direct or capacitive.

According to this embodiment, the spark-gap 22 cylindrical shape has preferably an external diameter of 15 cm and has a length of 15 cm, which makes it a compact spark-gap.

In FIG. 4, the spark-gap 21 according to the embodiment in FIG. 1 is inserted into an LTD generator stage. The discharge electrodes of the spark-gap are connected by the electrical connecting means to capacitors 21 which can be, but not exclusively, Maxwell type capacitors. The core 17 of the stage according to the embodiment in FIG. 4 is made of three rings, each ring being able to advantage to be made of a magnetic iron/silicon material. According to another embodiment, the core 17 may comprise more rings. The central insulating material 18 may be made of soft or hard plastic, as can the lateral insulating material 19. In operation a triggering ring 20 controlled by means external to the stage, is used to trigger the firing of the spark-gap 22.

The spark-gap 22, according to the embodiment in FIG. 1 comprises corona effect needles 10 which are all welded so as to point towards the positive discharge electrode 3, and a triggering electrode 5 provided halfway between the two discharge electrodes. This triggering electrode 5 is subjected to a potential of zero volts in the charging phase. Also, the spark-gap according to this embodiment comprises two non-equivalent zones in terms of polarity. A negative polarity zone and a positive polarity zone. When the spark-gap 22 is subjected to a difference of potential of 200 kV, each of the zones is therefore subjected to a difference of potential of 100 kV. The presence of the corona effect needle device 14 on the negative discharge electrode 4, which has a number of corona effect needles greater than the number of corona effect needles present on the intermediate electrodes 5, 6, 7 enables these two zones to withstand the same voltages at pressures of the order of 2.5 atm. To trigger firing, the triggering electrode 5 is subjected to a non nil potential, negative or positive. If the triggering pulse is positive, the negative polarity zone triggers first, causing the triggering of the positive polarity zone. If the triggering pulse is negative, the positive polarity zone triggers first, causing the triggering of the negative polarity zone.

It should be noted that in general terms the shape and structure of the different electrodes, anchoring means and corona effect needles are not restricted to the ones illustrated. All forms and structures adapted to distribute homogeneously a difference in potential within a sealed chamber intended to be the scene of a transfer of intense charge is also the object of this invention.

The invention claimed is:

1. Multichannel spark-gap with multiple intervals comprising:

- a sealed chamber comprising two electrodes mounted apart from each other, one having a positive discharge, the other having a negative discharge,
- at least one intermediate electrode, provided in the sealed chamber between the two discharge electrodes so as to delimit intervals between said discharge electrodes, one of the intermediate electrodes being immediately adjacent to the negative discharge electrode,
- electrical connecting means adapted to allow the positive discharge electrode to be connected to a positive potential and the negative discharge electrode to a negative potential,
- means adapted to allow at least one intermediate triggering electrode, to be subjected to a preset potential in a charge phase, and to a different potential enabling firing to be triggered, in a firing phase,
- needles provided in the sealed chamber to generate discharges therein by corona effect with a view to subjecting the intervals delimited by the electrodes to intermediate potentials,
- means for the distribution of a gas in the sealed chamber,
- said spark-gap being characterised in that the negative discharge electrode comprises a corona effect needle device whereof the geometry is adapted to compensate for differences in shape between the negative discharge electrode and the immediately adjacent intermediate electrode, so as to ensure a substantially homogenous distribution of the potentials throughout the chamber.

2. Spark-gap according to claim 1, characterised in that, wherein at least one corona effect needle is provided on each intermediate electrode, and wherein the needle device of the negative discharge electrode comprises at least one corona effect needle whose size is adapted so that the distance separating the tip of said corona effect needle of the needle device and said immediately adjacent intermediate electrode is different from each of the distances separating the tip of each corona effect needle of each intermediate electrode and the intermediate electrode located immediately facing.

3. Spark-gap according to claim 2, characterised in that the needle device of the negative discharge electrode comprises at least one corona effect needle whereof the size is adapted so that the distance separating the tip of said corona effect needle of the needle device and said immediately adjacent intermediate electrode is smaller than each of the distances separating the tip of each corona effect needle of each intermediate electrode and the intermediate electrode located immediately facing.

4. Spark-gap according to claim 3, characterised in that the needle device of the negative discharge electrode comprises at least one corona effect needle whereof the size is larger than each of the other corona effect needles of the chamber.

5. Spark-gap according to claim 4, characterised in that the length of the interval delimited by the negative discharge electrode and the immediately adjacent intermediate electrode is greater than the length of the other spark-gap intervals.

6. Spark-gap according to claim 1, characterised in that, wherein at least one corona effect needle is provided on each intermediate electrode, and wherein the needle device of the negative discharge electrode comprises a number of corona effect needles greater than the number of needles carried by each intermediate electrode.

7. Spark-gap according to claim 1, characterised in that the corona effect needles are mounted on each of the electrodes so as to point in the direction of the positive discharge electrode.

8. Spark-gap according to claim 1, characterised in that the negative discharge electrode comprises, in reinforcement inside the sealed chamber, means for reducing the electrical field in said chamber.

9. Spark-gap according to claim 8, characterised in that the means for reducing the electrical field of the negative discharge electrode comprise annular beads arranged around the corona effect needles carried by said negative discharge electrode.

10. Spark-gap according to claim 1, characterised in that the sealed chamber is cylindrical in shape and extends along a longitudinal axis, characterised in that each intermediate electrode is torus-shaped and comprises a diametrical rod on which each corona effect needle is mounted, so as to improve the distribution of the potentials in the chamber.

11. Spark-gap according to claim 10, characterised in that the intermediate electrodes are anchored in the chamber by spherical anchoring means, called anchoring balls, that are conductive and distributed uniformly around the longitudinal axis of the chamber.

12. Spark-gap according to claim 1, characterised in that the means for distributing gas in the sealed chamber comprise at least one pipe integral with at least one intermediate electrode, each pipe extending radially from the outside of the sealed chamber as far as the intermediate electrode.

13. Spark-gap according to claim 1, characterised in that it comprises a single intermediate triggering electrode, arranged halfway between the two discharge electrodes.

14. Spark-gap according to claim 1 comprising five intermediate electrodes, characterised in that the intervals delimited by two intermediate electrodes are substantially identical.

15. Spark-gap according to claim 14, characterised in that the length of the intervals, in the longitudinal direction, is less than 2 cm so as to limit the inductance.

16. Spark-gap according to claim 15, characterised in that the length of the intervals, in the longitudinal direction, is less than 1 cm so as to minimise the inductance.

17. Pulsed high-power generator of the Linear Transformer Driver (LTD) type, characterised in that it comprises at least one multichannel spark-gap with multiple intervals in accordance with claim 1.

18. Pulsed high-power generator of the LTD type according to claim 17, characterised in that it is connected via distribution means of the spark-gap or spark-gaps to a pressurised dry air source at 3 atm at least for an operation at 200 kV.

19. Pulsed high-power generator of the LTD type according to claim 17, characterised in that it is connected by electrical connecting means of the spark-gap or spark-gaps to a voltage source adapted to deliver a charging voltage of at least 200 kV.

20. Pulsed high-power generator of the LTD type according to claim 18, characterised in that it is connected by electrical connecting means of the spark-gap or spark-gaps to a voltage source adapted to deliver a charging voltage of at least 200 kV.

* * * * *